Dec. 20, 1966  M. V. DE JEAN ETAL  3,293,471
LAMINATED CORE CONSTRUCTION FOR ELECTRIC INDUCTIVE DEVICE
Original Filed Oct. 28, 1963
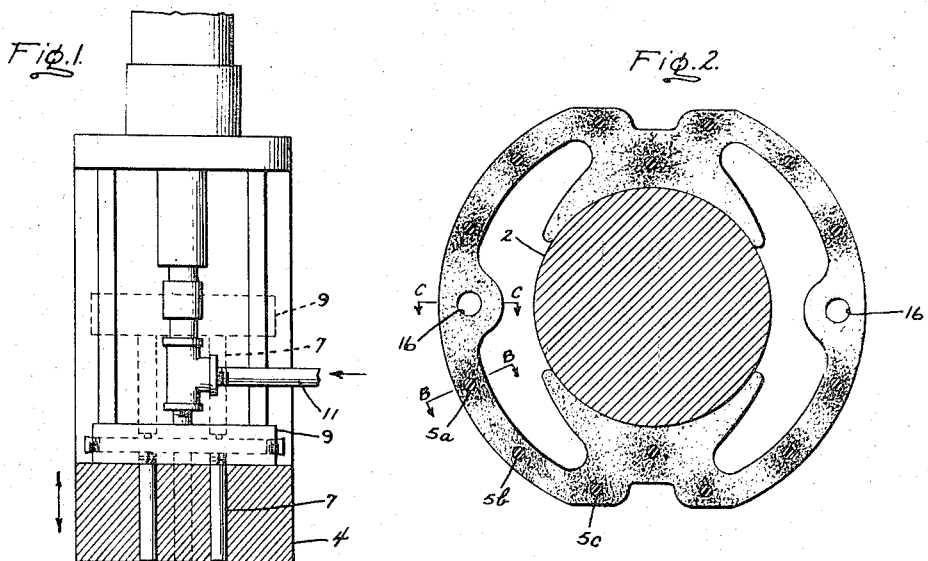
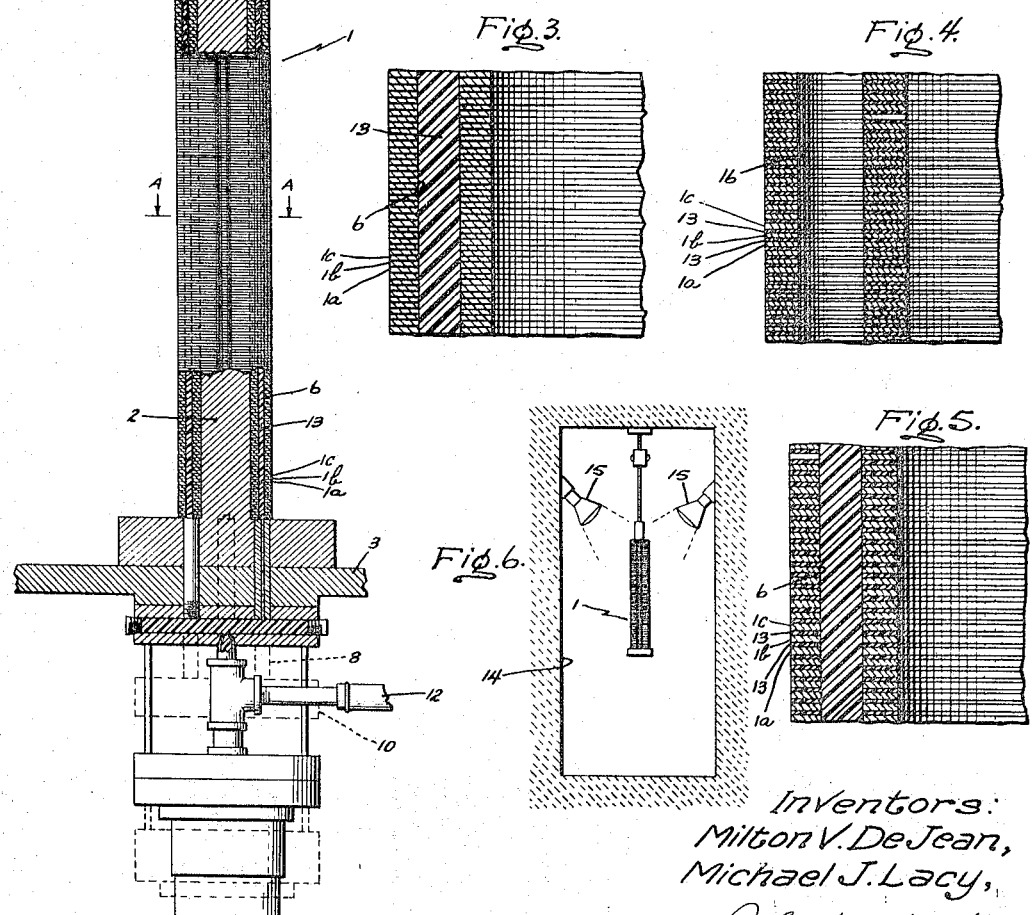
Inventors:
Milton V. DeJean,
Michael J. Lacy,
by John M. Stoudt
Attorney.

United States Patent Office  3,293,471
Patented Dec. 20, 1966

3,293,471
LAMINATED CORE CONSTRUCTION FOR ELECTRIC INDUCTIVE DEVICE
Milton V. De Jean, Pitcairn, Pa., and Michael J. Lacy, Florissant, Mo., assignors to General Electric Company, a corporation of New York
Original application Oct. 28, 1963, Ser. No. 320,255. Divided and this application Nov. 1, 1965, Ser. No. 505,852
5 Claims. (Cl. 310—217)

The present application is a division of our copending application S.N. 320,255, filed October 28, 1963, which in turn is a continuation of application Serial No. 785,061, filed January 5, 1959, now abandoned.

This invention relates to cores and more particularly to laminated cores of electric inductive devices, such as, dynamoelectric machines.

Dynamoelectric machines, i.e., motors and generators, conventionally include a stator core member and a rotor core member concentrically disposed within the stator member, at least one and frequently both of the members having a plurality of windings thereon. These core members are conventionally formed of a plurality of relatively thin laminations punched from magnetic steel. The number of laminations comprising the core conventionally have been selected by weight or by mechanical metering devices. Such a stack of laminations is then assembled and held together by welding, riveting, keying, or bonding the core with bonding material between the laminations. It is, of course, desirable to bond such laminated core structures together into a solid unitary piece without the use of welds, rivets, keys, or the coating of the laminations with bonding material between the laminations.

It is further desirable to eliminate the complex keying and riveting machines necessary to perform the respective functions and to eliminate the lamination stack sizing or selecting machines heretofore employed and to provide a simple means for readily sizing or selecting the laminated stacks in production.

It is an object of this invention to provide an improved laminated core.

Another object of this invention is to provide an improved laminated core structure wherein the laminations are united in rigid, strong, permanent relation without the use of welds, rivets, keys or the like.

Another object of this invention is to provide a laminated core structure which readily lends itself to mass production methods.

According to one form of the invention, a stack of core laminations, having winding accommodating means and aligned holes spaced from such means, are securely held together by a cured adhesive or resinous material such as a thixotropic heat curable, thermosetting epoxy resin, in a passageway extending through the stack of laminations. Some of the resin may be drawn by capillary action or forced under pressure between the laminations in the area of the holes. Under such conditions, the resin remaining in the hold may or may not be removed so that a "plastic" rivet may or may not remain in the hole. During curing of the resin, there is a secondary flow characteristic of the resin which results in the resin having a low viscosity, and thus the resin penetrates more freely into the laminations. Upon curing of the resin, the core is firmly bound together by (1) a plastic (or cured resinous) rivet extending through a hole or opening in the core, or (2) plastic material disposed between the laminations in the area of and surrounding the holes, or (3) a combination of these.

The invention together with additional objects and advantages thereof will be best understood from the following description of a specific embodiment, when read in connection with the accompanying drawing, in which:

FIGURE 1 is an elevation view, partly in section, illustrating one method of introducing resinous material into openings in the core laminations;

FIGURE 2 is a cross section through the stack of core laminations taken along plane A—A of FIGURE 1 and illustrating in plan view a typical core lamination;

FIGURE 3 illustrates a partial elevation view, in section, of a portion of a stack of core laminations taken along plane B—B of FIGURE 2 and illustrating a plastic rivet in an opening to the core laminations;

FIGURE 4 is a partial elevation view, in section, taken along plane C—C of FIGURE 2, illustrating an embodiment of the instant invention wherein the laminations are bound together by plastic material between the laminations;

FIGURE 5 is a partial elevation view, in section, of a passageway in a stack of core laminations wherein the laminations are secured together by both a plastic rivet and plastic material having been deposited between the laminations; and FIGURE 6 illustrates schematically a method of baking the core structure to set the resin.

Referring to FIGURE 1, there is illustrated the introduction of the resinous material into passageways formed of holes in a stack of laminations. The core laminations 1a, 1b, 1c, etc., are stacked on a mandrel 2 for orientation, thereby forming the lamination stack shown generally as 1. The stack may be of the desired height; or, in the alternative, it may be of a height many times that needed to form the desired single core member and the proper stack height may later be selected as hereinafter explained. The stacked laminations are then placed in a holding device, for example, between the stationary frame 3 and movable frame 4 which are brought together to securely hold the laminations 1 and mandrel 2. As more clearly seen in FIGURE 2, the core laminations contain a plurality of holes 5a, 5b, 5c, etc., which are so aligned on the mandrel that passageways 6 are provided through the finished core. Conduits 7, 8 having passageways 6 of the core laminations by the movement of members 9 and 10 from the position shown in phantom in FIGURE 1 to the position shown in solid lines in FIGURE 1. Resin, such as the aforementioned epoxy resin, may then be introduced through inlet conduits 11 which connects an opening in the manifold 9, which opening is, in turn, in communication with the openings in conduits 7. Similarly, the air can be removed from the passageways 6 through the openings in conduits 8, manifold 10, and exhaust conduit 12. There is a natural tendency for the resin to be drawn between the laminations due to capillary action; the stack of laminations forming a sort of wick for the resin. The material 13 may, however, if desired, be injected into the passageways 6 with sufficient pressure to assist or force the material to deposit or penetrate between the laminations.

The stack of laminations is then heated or baked to cure the resin, as, for example, in the oven 14, FIGURE 6, by the heat lamps 15. In the event that the resinous material is the above mentioned epoxy resin, the stack may be baked, for example, for about 15 minutes at a temperature of about 150° C. This is left in the passageways 6, as best seen in FIGURE 3, a plastic rivet 13 which retains the core laminations. In addition to the plastic rivet 13 as indicated in FIGURE 3, if the resin is injected into the passageways 6 with sufficient force to cause the material to penetrate between the laminations or if the resin is otherwise permitted to deposit between the laminations, the laminations may thereby be further bound together. Such a modification is hereinafter explained in discussing FIGURE 5 below.

It is not necessary to provide the laminations with special holes 5a, 5b, 5c, etc., for bonding, since the laminations frequently include holes 16 for through bolts (and other purposes) which attach the outer end shields (not shown) to the core. Besides the through bolt holes, if the core is a stator for a dynamoelectric machine of the salient pole type, the laminations will also generally include winding pin holes for the inserting of winding pins used to retain the stator windings in such machines; however, it will be understood that other types of machines may not contain winding pin holes. Such bolt holes, or winding pin holes, or such other holes that may be provided, may be utilized in place of the special rivet holes discussed above. The lamination stack 1 is placed on the mandrel 2 and held in place on the frames 3, 4 as above. The resinous material is now introduced into the holes preferably under a pressure sufficient to force the resinous material to penetrate between the laminations. While it is understood that there is a tendency for the resinous material to be drawn between the laminations due to capillary action a sufficient pressure will materially assist in depositing the resin more satisfactorily. A pressure in the range of 60 lb. per sq. in. to 1000 lb. per sq. in. appears satisfactory. The resinous material then penetrates and is deposited between the adjacent laminations and forms a layer between them. Once the penetration has been completed, the pressure can be released and air blown through the holes to clear the holes of excess material; layers of material still remain between the laminations. In this manner, the holes may then be used for their primary function, such as through bolts, winding pins, or the like. The core is then baked as above in the oven 14 and the layers of hardened resinous material disposed between the laminations surrounding the holes will hold the core firmly together. As illustrated in FIGURE 4, in the area of the bolt hole 16 the stack consists of alternate layers 1a, 1b, 1c, of laminations and bonding material 13. Thus, each lamination is stuck to the ones adjacent to it without plastic rivets holding the stack together as in the above first described modification.

While in the above preceding modification, the laminations are held together by plastic material between the laminations in the area of the passageway or hole 16, it is not necessary that the excess material be blown from the passageway 16; the core in that area will then be held together by both a plastic rivet and plastic material between the laminations in the area of the passageway. This is illustrated in FIGURE 5 wherein plastic material 13 fills the hole or passageway 6 and further penetrates between the laminations 1a, 1b, 1c, etc., in the area of the hole 6. Thus, each lamination is stuck to the one adjacent to it as well as being held by plastic rivets.

It will be quite obvious that all the modifications, or any combination thereof, may if desired (but it is not necessary), be combined to form a single core structure, as illustrated in FIGURE 2. In other words, the resin can be introduced into special rivet holes according to the first above described modification (as illustrated in FIGURE 3) and may, in other rivet holes of the same core be introduced with enough force to cause it to penetrate between the laminations (as illustrated in FIGURE 5). In other through holes, excess resin may be blown out after some resin is deposited between the laminations, thereby bonding the core by a layer of resin between the laminations. As to the first described modification wherein the laminations are secured by a plastic rivet, some resin will flow between the laminations. As to the first described modification wherein the laminations are secured by a plastic rivet, some resin will flow between the laminations due to capillary action or as a result of the aforesaid secondary flow characteristic of the resin during curing; therefore, it is likely that the plastic rivets will not be bonding the lamination alone, but will be working in combination with plastic material between the laminations.

If the lamination stack 1 is of a height greater than that needed for a single finished core, the desired core height may be selected and the stack may be divided into a number of core members of the desired height. Such a stack height selection may be accomplished in any well known method, for example, by slicing. The preparation of stacks of laminations of a length long enough for several cores has the further advantage that after curing and bonding, the lamination stack may be placed in storage or may be used for stack height selection as needed. This results in a reduction of core storage space since the rapidity at which the core height may be selected will permit the storage of lamination stacks only and the actual cores may be constructed by the method according to the invention as production thereof warrants.

It will be readily seen that our invention results in the elimination of core keys and rivets and in the elimination of complex core keying and riveting machines. It also permits the use of simple, low cost core height selecting methods and permits the reduction of core storage space. It was found that cores made according to the above described method have adequate strength for use in the above mentioned electric inductive devices. While the invention has been described specifically with relation to dynamoelectric machine cores, it is to be understood that the invention can be equally practiced with relation to other electric inductive devices, such as the cores of transformers.

In accordance with the patent statutes, we have described what at present are considered to be the preferred embodiments of our invention. However, it will be obvious to those skilled in the art that various changes and modifications may be made in the disclosed structure without departing from our invention, and it is, therefore aimed in the appended claims to cover all such changes and modifications as fall within the true spirit and scope of our invention.

What we claim as new and desire to secure by Letters Patent of the United States is:

1. A stack of laminations of a height greater than and useful as a core for an electric inductive device when cut to desired length, said stack of laminations having winding accommodating means and aligned holes spaced from said means forming at least one passageway axially through the stack, a first hardened resinous material disposed in the passageway, and a second hardened resinous material arranged between adjacent laminations in a relatively small area around the passageway, said first and said second hardened resinous materials securely holding said laminations together to form a unitary stack.

2. A core for an electric inductive device comprising a stack of laminations having winding accommodating means and aligned holes spaced from said means forming at least one passageway axially through the stack, a cured, resinous material disposed in the passageway, and cured resinous material disposed between adjacent laminations only in a relatively small area about said passageway, said cured resinous material in said passageway being continuous with said cured resinous material disposed between adjacent laminations to produce an integrated holding means for securely holding said laminations together to form a unitary core.

3. A core for an electric inductive device comprising a stack of laminations having winding accommodating means and aligned holes forming at least one passageway therethrough, and a hardened resinous material disposed between adjacent laminations solely in the vicinity of and surrounding said holes thereby to permit the stack to be formed of an axial length greater than the desired axial length of said core, said material securely bonding said laminations together to form a unitary core.

4. A stator core for use in a dynamoelectric machine comprising a plurality of laminations forming a laminated stack having a bore, winding accommodating means, and a plurality of passageways spaced from said bore and said means extending axially through said stack, and a cured resinous adhesive material positioned in the passageway in engagement with said laminations, said material projecting only slightly between adjacent laminations from said passageway and continuous with the material positioned in the passageway whereby said material securely bonds said laminations together.

5. A stator core for use in a dynamoelectric machine comprising a plurality of laminations forming a laminated stack having a bore, winding accommodating means formed adjacent said bore and at least two bolt holes extending through the stack spaced from said means and arranged adjacent the outer periphery of said laminations, and a cured resinous adhesive material disposed between adjacent laminations solely in the vicinity of said bolt holes, said material bonding said laminations together in juxtaposed relation.

References Cited by the Examiner

UNITED STATES PATENTS

| | | | |
|---|---|---|---|
| 2,057,503 | 10/1936 | Sawyer | 310—217 |
| 2,261,983 | 11/1941 | Ford | 310—217 |
| 2,423,869 | 7/1947 | Blessing | 310—216 |
| 2,437,270 | 3/1948 | Peek | 310—217 X |
| 2,883,566 | 4/1959 | Briggs | 310—217 |
| 3,222,626 | 12/1965 | Feinberg et al. | 310—217 |

MILTON O. HIRSHFIELD, *Primary Examiner.*

L. L. SMITH, *Assistant Examiner.*